US009143310B2

(12) United States Patent
Lee et al.

(10) Patent No.: US 9,143,310 B2
(45) Date of Patent: Sep. 22, 2015

(54) METHOD OF CORRECTING TIME MISALIGNMENT BETWEEN ENVELOPE AND PHASE COMPONENTS

(71) Applicant: Electronics and Telecommunications Research Institute, Daejeon (KR)

(72) Inventors: Sung Jun Lee, Daejeon (KR); Young Kyun Cho, Daejeon (KR); Seunghyun Jang, Daejeon (KR); Bong Hyuk Park, Daejeon (KR); Jae Ho Jung, Daejeon (KR); Kwangchun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/294,836

(22) Filed: Jun. 3, 2014

(65) Prior Publication Data

US 2015/0078500 A1      Mar. 19, 2015

(30) Foreign Application Priority Data

Sep. 16, 2013  (KR) .................. 10-2013-0111272

(51) Int. Cl.
*H04L 27/02*   (2006.01)
*H04L 7/00*    (2006.01)

(52) U.S. Cl.
CPC .................... *H04L 7/0016* (2013.01)

(58) Field of Classification Search
CPC . H04L 27/361; H04L 27/0008; H04L 27/362; H04L 27/02
USPC ................................. 375/295–297
See application file for complete search history.

(56) References Cited

U.S. PATENT DOCUMENTS

| | | | | |
|---|---|---|---|---|
| 6,043,707 A * | 3/2000 | Budnik | ........................... | 330/10 |
| 6,313,703 B1 * | 11/2001 | Wright et al. | ................. | 330/149 |
| 6,529,716 B1 * | 3/2003 | Eidson et al. | .............. | 455/115.1 |
| 6,741,643 B1 * | 5/2004 | McGibney | .................... | 375/229 |
| 6,822,595 B1 * | 11/2004 | Robinson | ...................... | 341/144 |
| 6,853,244 B2 * | 2/2005 | Robinson et al. | ............... | 330/51 |
| 6,987,417 B2 * | 1/2006 | Winter et al. | .................. | 330/10 |
| 6,998,914 B2 * | 2/2006 | Robinson | ................. | 330/124 R |
| 7,043,213 B2 * | 5/2006 | Robinson et al. | .......... | 455/127.2 |
| 7,280,003 B2 * | 10/2007 | Belot et al. | .................... | 332/144 |
| 7,359,680 B2 * | 4/2008 | Klemmer | ...................... | 455/102 |
| 7,372,917 B2 * | 5/2008 | Jensen | .......................... | 375/296 |
| 7,443,324 B1 * | 10/2008 | Muhammad | .................. | 341/131 |

(Continued)

FOREIGN PATENT DOCUMENTS

KR  10-2009-0036671  4/2009
KR  1020100069126    6/2010

*Primary Examiner* — Emmanuel Bayard
(74) *Attorney, Agent, or Firm* — Nelson Mullins Riley & Scarborough LLP; Anthony A. Laurentano, Esq.; Lewis Lee, Esq.

(57) ABSTRACT

Provided is a method of correcting a time misalignment between envelope and phase components in a transmitting apparatus which separates envelope and phase components of a signal, processes them, and then recombines them to transmit the recombined signal. For this, in a method of correcting a time misalignment between envelope and phase components according to an embodiment of the present invention, a time misalignment is corrected by applying a time delay to at least one of envelope and phase components in digital and analog signal processing operations, or applying a time delay to an envelope or phase component by a pre-processing operation.

10 Claims, 4 Drawing Sheets

(56) References Cited

U.S. PATENT DOCUMENTS

| | | | | |
|---|---|---|---|---|
| 7,453,927 | B2* | 11/2008 | Vepsalainen et al. | 375/219 |
| 7,519,336 | B2* | 4/2009 | Vepsalainen et al. | 455/127.1 |
| 7,522,676 | B2* | 4/2009 | Matero | 375/295 |
| 7,573,949 | B2* | 8/2009 | Matsuura et al. | 375/295 |
| 7,715,808 | B2* | 5/2010 | Shimizu et al. | 455/108 |
| 7,755,443 | B2* | 7/2010 | Osman et al. | 332/144 |
| 7,860,188 | B2* | 12/2010 | Jensen | 375/308 |
| 7,915,969 | B2* | 3/2011 | Shimizu et al. | 332/103 |
| 7,978,009 | B2* | 7/2011 | Mu | 330/253 |
| 7,983,359 | B2* | 7/2011 | Reddy et al. | 375/298 |
| 7,995,697 | B2* | 8/2011 | Lewis et al. | 375/376 |
| 8,054,912 | B2* | 11/2011 | Ba et al. | 375/297 |
| 8,059,748 | B2* | 11/2011 | See et al. | 375/296 |
| 8,081,711 | B2* | 12/2011 | Lee et al. | 375/296 |
| 8,126,409 | B2* | 2/2012 | Osman et al. | 455/102 |
| 8,126,411 | B2* | 2/2012 | Kim | 455/126 |
| 8,131,233 | B2* | 3/2012 | Lee et al. | 455/114.3 |
| 8,150,336 | B2* | 4/2012 | Waheed et al. | 455/114.3 |
| 8,190,111 | B2* | 5/2012 | Feltgen et al. | 455/180.3 |
| 8,233,854 | B2 | 7/2012 | Li Puma et al. | 455/118 |
| 8,300,728 | B1* | 10/2012 | Hoffmann et al. | 375/302 |
| 8,391,406 | B2* | 3/2013 | Kim et al. | 375/297 |
| 8,411,788 | B2* | 4/2013 | Sahota | 375/295 |
| 8,472,559 | B2* | 6/2013 | Chang et al. | 375/302 |
| 8,514,972 | B2* | 8/2013 | Kang et al. | 375/296 |
| 8,520,767 | B2* | 8/2013 | Omoto et al. | 375/295 |
| 8,565,344 | B2* | 10/2013 | Kitamura et al. | 375/298 |
| 8,583,060 | B2* | 11/2013 | Li Puma et al. | 455/108 |
| 8,791,846 | B2* | 7/2014 | Cho et al. | 341/143 |
| 8,873,611 | B2* | 10/2014 | Hori et al. | 375/227 |
| 9,014,281 | B2* | 4/2015 | Cho et al. | 375/247 |
| 2002/0193085 | A1* | 12/2002 | Mathe et al. | 455/126 |
| 2007/0160164 | A1 | 7/2007 | Sahota | |
| 2007/0189431 | A1* | 8/2007 | Waheed et al. | 375/376 |
| 2008/0205571 | A1* | 8/2008 | Muhammad et al. | 375/376 |
| 2009/0227273 | A1* | 9/2009 | McCune, Jr. | 455/466 |
| 2009/0274244 | A1 | 11/2009 | Jensen | |
| 2010/0233977 | A1* | 9/2010 | Minnis et al. | 455/127.1 |
| 2014/0064355 | A1* | 3/2014 | Cho et al. | 375/238 |
| 2014/0205041 | A1* | 7/2014 | Hori | 375/295 |

* cited by examiner

METHOD OF CORRECTING TIME MISALIGNMENT BETWEEN ENVELOPE AND PHASE COMPONENTS

CROSS-REFERENCE TO RELATED APPLICATIONS

This U.S. non-provisional patent application claims priority to and the benefit of under 35 U.S.C. §119 Korean Patent Application No. 10-2013-0111272, filed on Sep. 16, 2013, the entire contents of which is hereby incorporated by reference.

BACKGROUND OF THE INVENTION

The present invention disclosed herein relates to a wireless communication system, and more particularly, to a method of correcting a time misalignment between envelope and phase components of a signal.

Modern wireless communication systems use complex modulation schemes to obtain higher data transmission rates within limited frequency resources. Owing to this, a transmission signal has a high peak-to-average power ratio (PAPR) that is a hostile condition for a power amplifier (PA) to obtain high efficiency. Also, since a today's base station tends to be miniaturized, a request for a PA structure of high efficiency is increased.

An envelope elimination and restoration (EER) structure is one of the highly efficient PA structures, and, in order to obtain high efficiency, has a structure of separating envelope and phase components of a signal, processing them respectively, and recombining them. Typically, an EER structure means a Kahn structure, but all structures, such as an improved Kahn structure or a digital polar modulator structure, separating envelope and phase components and processing can be considered as the EER structure. Among the EER structure, a structure applying a delta-sigma modulator (DSM) to an envelope component is called as an envelope delta-sigma modulator (EDSM) structure.

For any EER structure, a time misalignment of the envelope and phase components is directly connected to signal quality degradation. Since it is highly possible that the time misalignment of the envelope and phase components occur while they are separately processed, it is necessary to correct this time misalignment.

SUMMARY OF THE INVENTION

The present invention provides a method of correcting a time misalignment between envelope and phase components in real time, which prevents signal quality degradation due to the time misalignment in an arbitrary envelope delta-sigma modulator (EDSM) structure.

The present invention also provides a method of correcting a time misalignment between envelope and phase components in non-real time, by which performances of an arbitrary EER structure can be checked, except existence of the time misalignment.

The first embodiments of the present invention provide methods of correcting a time misalignment between envelope and phase components, including: separating into the envelope and phase components; delaying at least one of the separated components by a first time on the basis of a sample unit N; digital-to-analog converting the first time delayed envelope and phase components; delaying the digital-to-analog converted envelope component by a second time on the basis of clock unit M when delta-sigma modulating the digital-to-analog converted envelope component; determining whether a combination of the first time delaying operation and the second time delaying operation shows an optimal performance; and according to the determining, controlling values of N and M according to the first time and second time delaying operations.

In the first embodiments, the methods may further include: up-converting the digital-to-analog converted phase component; mixing the up-converted phase component and the second time delayed envelope component; and amplifying the mixed signal and transmitting the amplified signal.

In the first embodiments, N is 0 or a positive integer.

In the first embodiments, a sample rate related to N may be an input data rate for the digital-to-analog conversion.

In the first embodiments, M may be 0 or multiples of 0.5.

In the first embodiments, a clock speed related to M is an operation speed of the delta-sigma modulation.

In the second embodiments of the present invention, methods of correcting a time misalignment between envelope and phase components, including: interpolating transmission data at a sufficient rate for correcting the time misalignment; separating the interpolated transmitted data into envelope and phase components; delaying at least one of the separated components on the basis of a sample unit K and recombining the two components; decimating the recombined data at a rate of initial baseband data to be downloaded to a transmitting apparatus; determining whether the time delay applied to the decimated data shows optimal performance; and controlling a value of K according to a result of the determining.

In the second embodiments, the method may further include: up-converting the phase component in the transmitting apparatus; delta-sigma modulating the envelope component in the transmitting apparatus; mixing the up-converted phase component and the delta-sigma modulated envelope component in the transmitting apparatus; and amplifying the mixed signal and transmitting the amplified signal in the transmitting apparatus.

In the second embodiments, K is 0 or a positive integer.

In the second embodiments, a sample rate related to K is equal to the rate of the interpolated data.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

The embodiment of the present invention provides a method of correcting a time misalignment occurring between envelope and phase components in an apparatus that separates the envelope and phase components of a signal, processes them respectively, and recombines them to transmit, in order to increase power amplifier efficiency.

Figure 1:
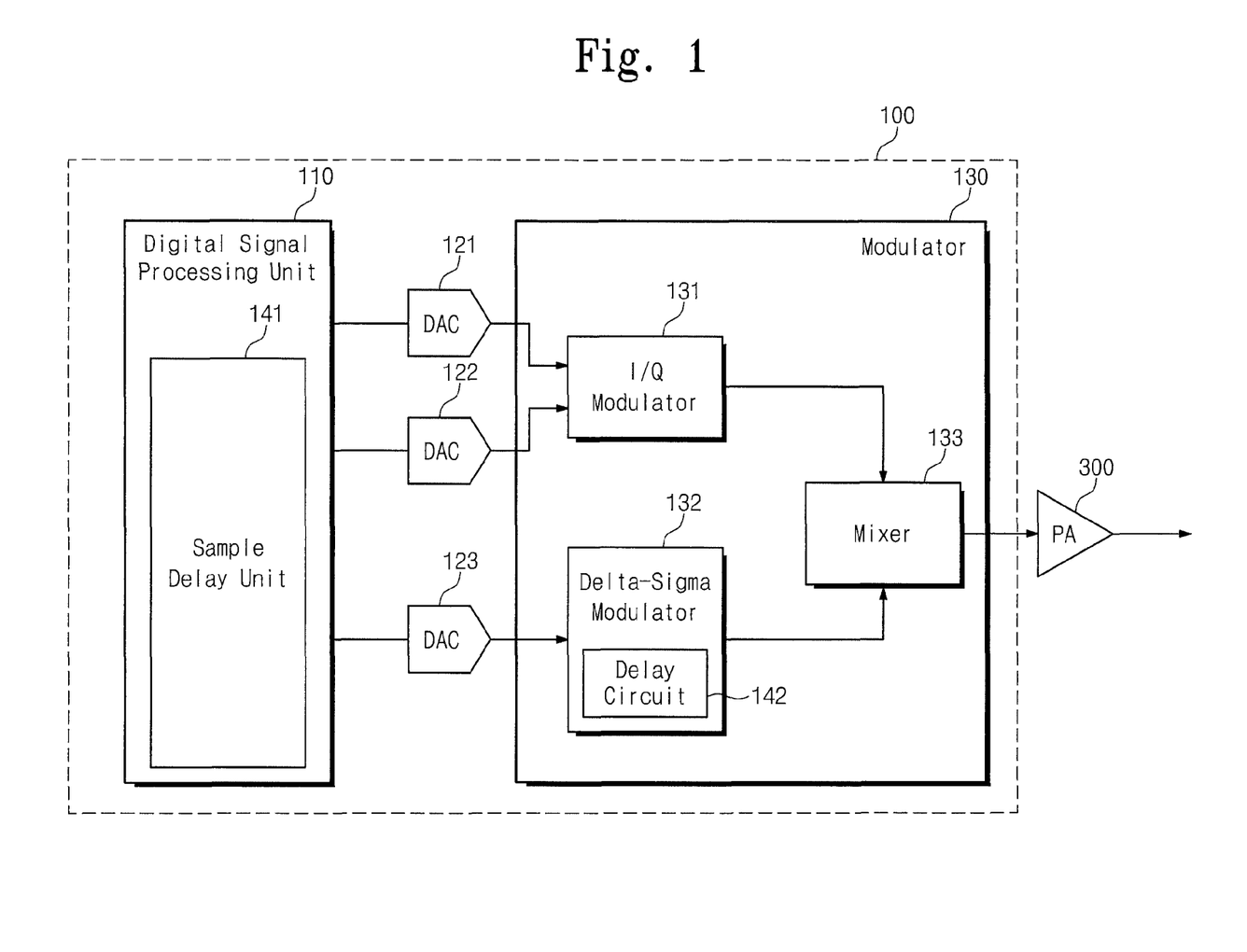
FIG. 1 illustrates an exemplary envelope delta-sigma modulator (EDSM) structure to which a method of correcting a time misalignment operable in real time is applied, according to an embodiment of the present invention.

FIG. 1 illustrates an exemplary envelope delta-sigma modulator (EDSM) structure to which a method of correcting a time misalignment operable in real time is applied, according to an embodiment of the present invention.

Referring to FIG. 1, a signal processing device 100 includes a digital signal processing unit 110, digital-to-analog converters (DACs) 121, 122, and 123, and a modulator 130. Here, the signal processing device 100 has an EDSM structure to which a time misalignment correcting method is applied. An output of the signal processing device 100 drives a power amplifier 300.

The digital signal processing unit 110 generates transmission data to be transmitted. A signal generated in the digital signal processing unit 110 may be expressed as Equation (1):

$$c(t)=(i(t)+j(q(t))=a(t)\cdot e^{j\phi(t)} \quad (1)$$

Here, a(t) is an envelope of a complex signal, and φ(t) is a phase of the complex signal.

The digital signal processing unit 110 outputs data related to a phase component of transmission data to the first and second DACs 121 and 122. The digital signal processing unit 110 outputs an envelope component of the transmission data to the third DAC 123.

The digital signal processing unit 110 includes a sample delay unit 141 for correcting a time misalignment between the envelope and phase components. An operation of the sample delay unit 141 may be described below in detail.

The first DAC 121 outputs a cos(φ(t)) signal related to the phase component to the modulator 130.

The second DAC 122 outputs a sin(φ(t)) signal related to the phase component to the modulator 130.

The third DAC 123 output an envelope component a(t) signal to the modulator 130.

The modulator 130 modulates outputs of the DACs 121, 122, and 123. The modulator 130 is an EDSM structure including an I/Q modulator 131, a delta-sigma modulator (DSM) 132, and a mixer 133.

The I/Q modulator 131 modulates the outputs of the first and second DACs 121 and 122 in in-phase/quadrature phase (I/Q) and generates the up-converted phase component to the mixer 133. The output signal from I/Q modulator 131 can be expressed as Equation (2):

$$up(t)=\cos(2\pi f_c t+\phi(t)) \quad (2)$$

Namely, the I/Q modulator 131 generates up(t) signal from cos(φ(t)) and sin(φ(t)) signals. Here, $f_c$ denotes a carrier frequency.

An output signal m(t) of the DSM 132 can be expressed as Equation (3):

$$m(t)=a(t)+e(t) \quad (3)$$

The DSM 132 generates a signal of m(t) from a signal of a(t). Here, e(t) denotes a shaped quantization noise of the DSM 132.

In the method of correcting the time misalignment in real time according to the embodiment of the present invention, the DSM 132 includes a delay circuit 142. When delta-sigma modulating an output of the third DAC 132 and outputting the modulated result, the DSM 132 may apply a time delay by using the delay circuit 142. An operation of the delay circuit 142 is described below in detail.

The mixer 133 mixes m(t) and up(t), and outputs the mixed signal d(t) to the power amplifier 300. The output of the mixer 133 can be expressed as Equation (4):

$$d(t)=(a(t)+e(t))\cdot\cos(2\pi f_c t+\phi(t)) \quad (4)$$

Since the envelope and phase components are separately processed, a time misalignment is highly possible to occur. And thus, an output of the mixer 133 can be expressed as Equation (5):

$$d(t)=(a(t-\tau)+e(t))\cdot\cos(2\pi f_c t+\phi(t)) \quad (5)$$

Here, τ denotes a time delay of the envelope component in comparison with the phase component.

This time difference degrades an error vector magnitude (EVM) and an adjacent channel leakage ratio (ACLR). For example, when a long term evolution (LTE) signal of 10 MHz bandwidth using 64-quadrature amplitude modulation (QAM) is input to the device of FIG. 1, a result of baseband equivalent simulation for the output d(t) of the mixer 133 is shown in Table 1. Here, $f_{DSM}$ means an operating speed of the DSM and 522.24 MHz is assumed.

TABLE 1

| DSM order | time delay of an applied phase component (0/fDSM) | | | time delay of an applied phase component (1/fDSM) | | | time delay of an applied phase component (2/fDSM) | | | time delay of an applied phase component (3/fDSM) | | | time delay of an applied phase component (4/fDSM) | | |
|---|---|---|---|---|---|---|---|---|---|---|---|---|---|---|---|
| | EVM (%) | ACLR(dB) Low | High | EVM (%) | ACLR(dB) Low | High | EVM (%) | ACLR(dB) Low | High | EVM (%) | ACLR(dB) Low | High | EVM (%) | ACLR(dB) Low | High |
| 1 | 3.48 | 37.03 | 37.19 | 2.97 | 39.40 | 39.30 | 3.14 | 39.24 | 39.22 | 3.88 | 36.80 | 36.98 | 4.92 | 34.12 | 34.38 |
| 2 | 4.76 | 34.76 | 35.14 | 3.73 | 38.35 | 38.55 | 3.06 | 42.80 | 42.62 | 2.98 | 43.15 | 43.10 | 3.53 | 38.91 | 39.13 |

In EDSM, an inherent time delay exists, which occurs during a DSM operation, and this inherent time delay is proportional to an order of the DSM.

In Table 1, it can be confirmed that, when the order of DSM is 1, a result of applying $1/f_{DSM}$ delay to the phase component shows the best and, when the order of DSM is 2, a result of applying $3/f_{DSM}$ delay to the phase component shows the best.

That is, as the order of the DSM increases, a time delay of an envelope component passing through the DSM 132 is increased. Therefore, a time delay to be applied to a phase component is also increased.

Assuming that an inherent time delay of the DSM is an entire time difference between the envelope and phase components, when the time misalignment is not corrected (namely, $0/f_{DSM}$), it can be confirmed that the EVM is degraded about 1.5% p, compared to a case of correcting the time misalignment, regardless of the order of DSM. Also, when the time misalignment is not corrected, it can be confirmed that the ACLR is degraded about 2 dB in a case where the order of the DSM is 1, and about 9 dB in a case where the order of the DSM is 2.

For the time alignment, a delay line, which causes a time delay in an analog path, can be used. However, for generating $1/f_{DSM}$ delay, a delay line of about 29 cm is necessary. For generating $3/f_{DSM}$ delay, a delay line of about 86 cm is necessary. This is the case that permittivity of the delay line is assumed as about 4. The time misalignment correcting method using the delay line is not possibly applied to an integrated realization of the modulator 132, and is also difficult to actually apply to a hybrid realization of the modulator 132.

When an input data rate for the DAC in the digital signal processing unit 110 is about $f_{DSM}$ (=522.24 MHz) or faster, it is not difficult to correct the time misalignment of the envelope and phase components by generating a time delay in a digital domain. However, since an input data rate for a DAC of a digital board is maximally about 122.88 MHz, it is difficult to correct the time misalignment of the envelope and phase components by generating a time delay in the digital domain.

Therefore, in the embodiment, an entire time difference between the envelope and phase components is corrected by applying a digital sample delay unit to the envelope or phase component in the sample delay unit 141 and using the delay circuit 142 providing a time delay of a clock unit in a DSM circuit which operates at an operation speed of $f_{DSM}$.

Here, the sample delay unit 141 may delay the envelope component or/and the phase component of the digital samples in correspondence to a control signal, and output the delayed result. Also, the delay circuit 142 may delay the delta-sigma modulated envelope component and output the delayed result in response to the control signal. This control signal may be generated by an external control device outside the signal processing apparatus 100 or/and the digital signal processor 110.

Operations of correcting the time misalignment of the envelope and phase components in the sample delay unit 141 and the delay circuit 142 are as follows.

For example, in the digital signal processing unit 110, it is assumed that the input data rate for the DAC is 92.16 MHz, and the DSM operates at 522.24 MHz, and an inherent time delay of the DSM 132 is an entire time difference between the envelope and phase components before correction.

The sample delay unit 141 delays a phase component of transmission data by a single sample unit and outputs the delayed phase component to the DACs 121 and 122. Through this, a time delay of about 10.85 ns ($\approx 1/92.16$ MHz) occurs in the phase component.

When the envelope component passes through a DSM 132 of which order is 2, the inherent time delay of the DSM 132 of about 5.74 ns ($\approx 3/522.24$ MHz) occurs.

At this time, the delay circuit 142 delays the envelope component by three clock units and outputs the delayed envelope component to the mixer 133. Through this, an entire time delay of about 11.49 ns ($\approx 6/522.24$ MHz) occurs.

Through this, the time difference between the envelope and phase components of an output signal from the signal processing apparatus 100 can be corrected to about 0.64 ns from about 5.74 ns.

For another example, there is a case where a large propagation delay exists in the analog path for a phase component. Here, it is assumed that the whole delay of the phase path is about 20 ns.

In this case, the sample delay unit 141 delays the envelope component by one sample unit and outputs the delayed envelope component to the third DAC 123. Accordingly, about 10.85 ns ($\approx 1/92.16$ MHz) time delay is generated in the magnitude component.

Also, the delay circuit 142 delays the envelope component by two clock units. Through this, an additional time delay of about 9.57 ns ($\approx 5/522.24$ MHz) is generated for the envelope component.

Through this, an entire time delay of about 20.43 ns ($\approx 1/92.16$ MHz+5/522.24 MHz) is generated for the envelope component and a time difference between envelope and phase components of the output signal from the signal processing apparatus 100 can be corrected to about 0.43 ns.

Table 2 shows an effect of applying a method of correcting a time misalignment between the envelope and phase components operable in real time according to an embodiment of the present invention.

TABLE 2

| Digital signal processing speed | EVM (%) | ACLR(dB) Low | ACLR(dB) High | Note |
|---|---|---|---|---|
| 522.24 MHz | 2.98 | 43.16 | 43.10 | Assume ideal digital speed (reference value) |
| 92.16 MHz | 3.05 | 42.33 | 42.31 | Apply proposed time mis- |
| 122.88 MHz | 3.04 | 42.26 | 42.07 | alignment correcting method |

Table 2 shows performance in case where an LTE signal having 10 MHz bandwidth is input. At this time, the modulation scheme is 64-QAM, $f_{DSM}$ is 522.24 MHz, and a carrier frequency $f_c$ is 2600 MHz.

It can be confirmed that a result of a case where a time misalignment correcting method between envelope and phase components according to the embodiment of the present invention is applied is similar to a result of a case where a sample delay is applied to an envelope or phase component with 1/522.24 MHz resolution. The digital operation speed of 522.24 MHz is not practically acceptable as described above, and used here as a condition for obtaining a reference value.

Figure 2:
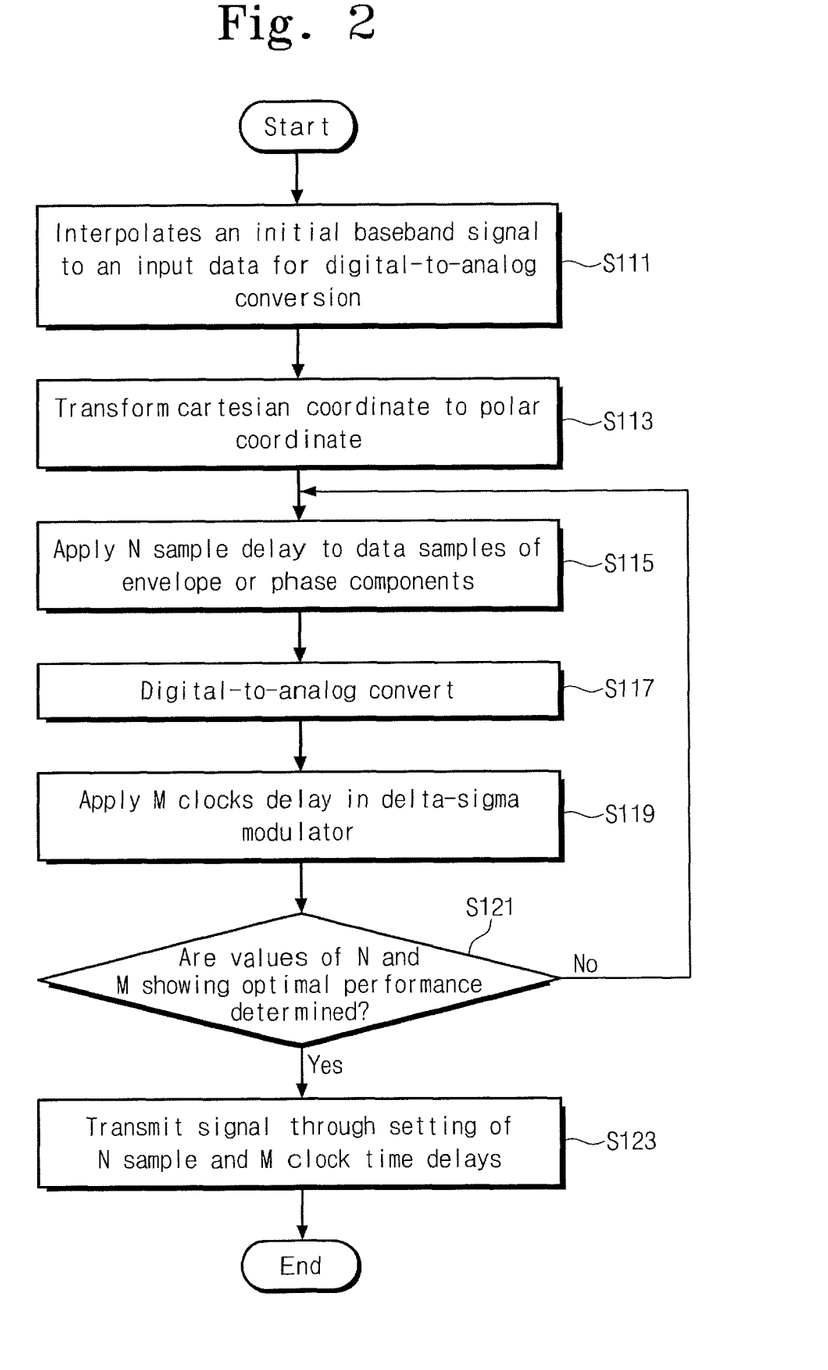
FIG. 2 illustrates an exemplary operation of correcting a time misalignment between envelope and phase components in the structure of FIG. 1.

FIG. 2 illustrates an exemplary operation of correcting a time misalignment between envelope and phase components in the structure of FIG. 1.

Referring to FIG. 2, the signal processing apparatus 100 interpolates an initial baseband signal to an input data for digital-to-analog conversion (operation S111). Namely, the sample rate of the interpolated signal is equal to an input data rate to the DACs 121, 122, and 123.

The signal processing apparatus 100 transforms the transmission data from Cartesian coordinates (I+jQ) into polar coordinates (A∠φ) (operation S113). Through this, the signal processing apparatus 100 may separate the transmission data into envelope and phase components.

The signal processing apparatus 100 applies a time delay to at least one of the envelope and phase components on the basis of a sample unit N (operation S115). Here, N is 0 or a positive integer (1, 2, 3 . . . ).

The signal processing apparatus 100 digital-to-analog-converts envelope and phase components that are delayed by the N sample unit (operation S117).

The signal processing apparatus 100 applies a time delay on the basis of a clock unit M, when the digital-to-analog-converted envelope component is delta-sigma-modulated (operation S119). Here, M may be 0 or the multiples of 0.5 (0.5, 1.0, 1.5, 2.0, . . . ).

It is determined whether a combination of N and M values enables the signal processing apparatus 100 to have optimal performance (operation S121). Here, the performance means the EVM and ACLR of an output d(t) of the mixer 133. That is, N and M values are determined based on the EVM and ACLR. Here, the sample rate related to N is an input data rate for digital-to-analog conversion (namely, the DACs 121, 122, and 123), and a clock speed related to M is an operation speed of the delta-sigma conversion (namely, the DSM 132).

When current N and M values are not determined to show the optimal performance, the signal processing apparatus 100 proceeds to operation S115.

When N and M values are determined to show the optimal performance, the signal processing apparatus 100 proceeds to S123.

The signal processing apparatus 100 transmits a signal by setting N sample time delay and M clock time delay (operation S123). The signal processing apparatus 100 mixes envelope and phase components to which the set time delays are applied. The signal processing apparatus 100 drives the power amplifier 300 with the mixed signal.

Figure 3:
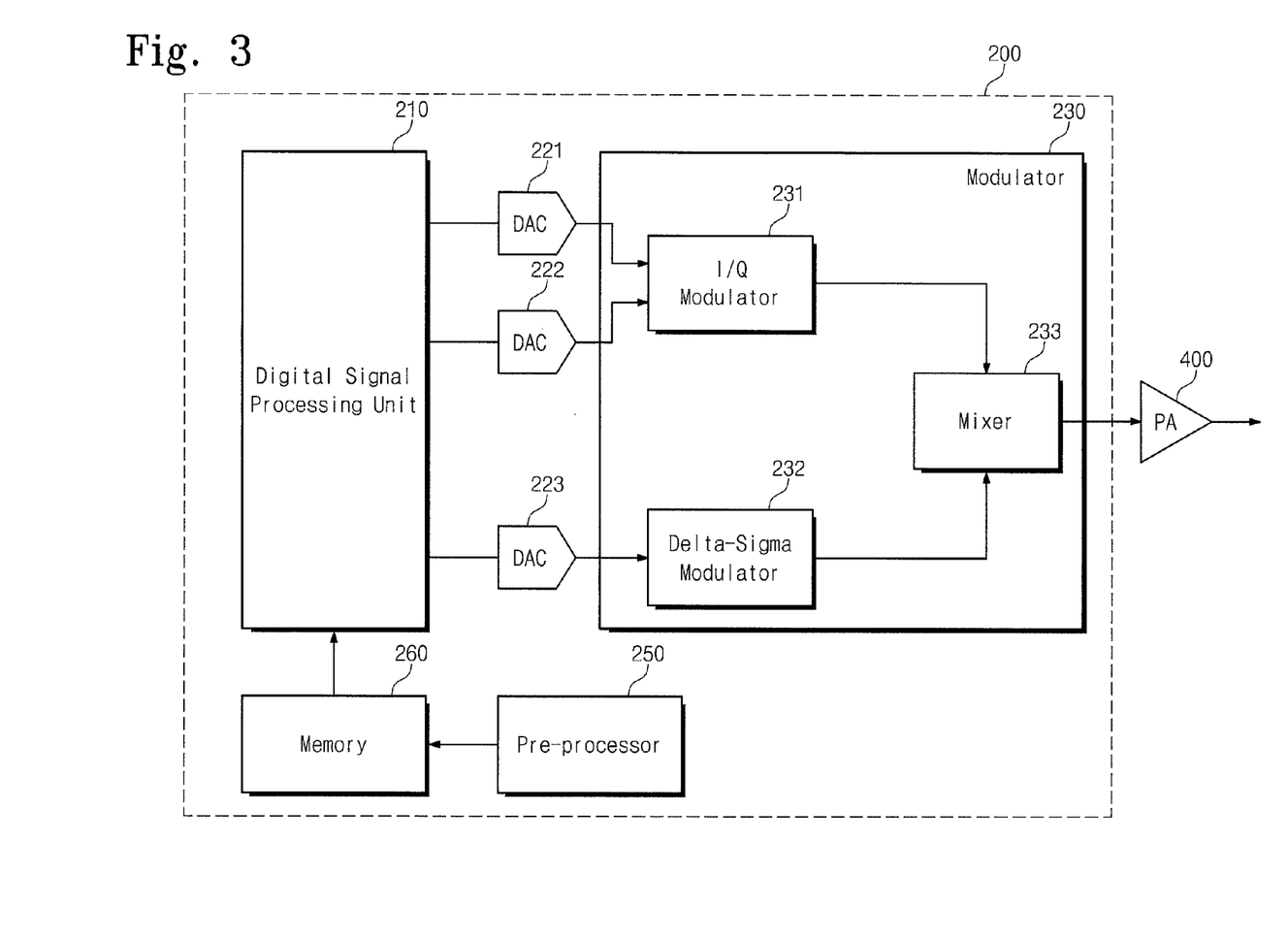
FIG. 3 illustrates an exemplary envelop elimination and restoration (EER) structure to which a method of correcting a time misalignment in non-real time is applied according to an embodiment of the present invention, which requires pre-processing of a signal.

FIG. 3 illustrates an exemplary EER structure to which a time misalignment correction method is applied in non-real time according to an embodiment of the present invention, which requires pre-processing of a signal.

Referring FIG. 3, the signal processing apparatus 200 includes a digital signal processing unit 210, DACs 221, 222, and 223, a modulator 230, a pre-processor 250, and a memory 260.

The signal processing apparatus 200 has an entirely similar structure to that of the signal processing apparatus 100 of FIG. 1. Accordingly, description of the signal processing apparatus 200 refers to that of the signal processing apparatus 100.

The digital signal processing unit 210 outputs a phase component of transmission data to the first and second DACs 221 and 222. The digital signal processing unit 210 outputs an envelope component of the transmission data to the third DAC 223.

The first DAC 221 outputs $\cos(\phi(t))$ signal related to the phase component to the modulator 230.

The second DAC 222 outputs $\sin(\phi(t))$ signal related to the phase component to the modulator 230.

The third DAC 223 outputs an envelope component a(t) to the modulator 230.

The modulator 230 modulates outputs of the DACs 221, 222, and 223. The modulator 230 is an EDSM structure including an I/O modulator 231, a DSM 232, and a mixer 233. Here, the EDSM structure, which is shown as the modulator 230, shows an example of an arbitrary EER structure.

The I/O modulator 231 modulates the outputs of the first and second DACs 221 and 222 in in-phase/quadrature phase (I/Q) and generates the up-converted phase component to the mixer 233.

The DSM 232 delta-sigma modulates an output of the third DAC 223 and outputs the modulated result to the mixer 233.

The mixer 233 mixes the outputs of the I/Q modulator 231 and the DSM 232. The mixer 233 outputs the mixed signal to the power amplifier 400.

The pre-processor 250 interpolates transmission data, namely, an initial baseband signal as necessary and then applies a time delay for correcting a time misalignment between the envelope and phase components. The pre-processor 250 interpolates the transmission data at a high sample rate that is not supported by the digital signal processing unit 210. Then, the pre-processor 250 separates the envelope and phase components, applies a time delay to the envelope component or the phase component, re-combines them, decimates the recombined data at a rate of initial baseband data that is downloaded to the digital signal processing unit 210, and outputs the decimated data to the memory 260. For example, it is assumed that the DSM operates at 522.24 MHz, and an inherent time delay of the DSM 232 is an entire time difference between the envelope and phase components before correction. The pre-processor 250 applies a time delay of about 5.74 ns ($\approx 3/522.24$ MHz) to the phase component of the transmission data after the interpolation at 522.24 MHz rate. Then, the pre-processor 250 recombines the envelope component and the time delay-applied phase component, decimates the recombined data at a rate of initial baseband data that is downloaded to the digital signal processing unit 210, and outputs the decimated data to the memory 260.

The memory 260 stores transmission data converted at the initial baseband data rate, which is to be downloaded to the digital signal processing unit 210.

The digital signal processing unit 210 loads and uses the transmission data stored in the memory 260. For example, it is assumed that the initial baseband data rate of the digital signal processing unit 210 is 30.72 MHz.

The digital signal processing unit 210 may prevent performance degradation according to a time misalignment by loading and using the baseband data having 30.72 MHz data rate stored in the memory 260.

Table 3 shows an effect of applying a method of correcting a time misalignment between the envelope and phase components in the signal processing apparatus 200 according to an embodiment of the present invention. At this time, two cases are assumed where input data rates to the DACs 221, 222, and 223 are 92.16 MHz and 122.88 MHz.

TABLE 3

| Digital signal processing speed | EVM (%) | ACLR(dB) Low | ACLR(dB) High | Note |
|---|---|---|---|---|
| 92.16 MHz | 3.21 | 39.39 | 39.49 | Apply proposed time misalignment correcting method |
| 122.88 MHz | 3.17 | 40.39 | 40.35 | |

Table 3 shows performance in case where an LTE signal having 10 MHz bandwidth is input. At this time, the modulation scheme is 64-QAM, $f_{DSM}$ is 522.24 MHz, and a carrier frequency $f_c$ is 2600 MHz.

From comparison Table 3 with Table 2, it may be confirmed that a time misalignment between the envelope and phase components is correctable.

The time misalignment correcting method like this is not possibly applied in real time, since pre-processing is necessary. Performance after correction is not better than that of the real-time time misalignment correcting method according to the embodiment of the present invention of FIG. 1. However, as described above, the non-real-time time misalignment correcting method shown in FIG. 3 is applied to an already implemented EDSM structure which lacks a delay circuit in DSM, or to an EER structure which is not the EDSM structure, and minimizes performance degradation according to the time misalignment. And thus, performances except existence of the time misalignment can be confirmed.

Figure 4:
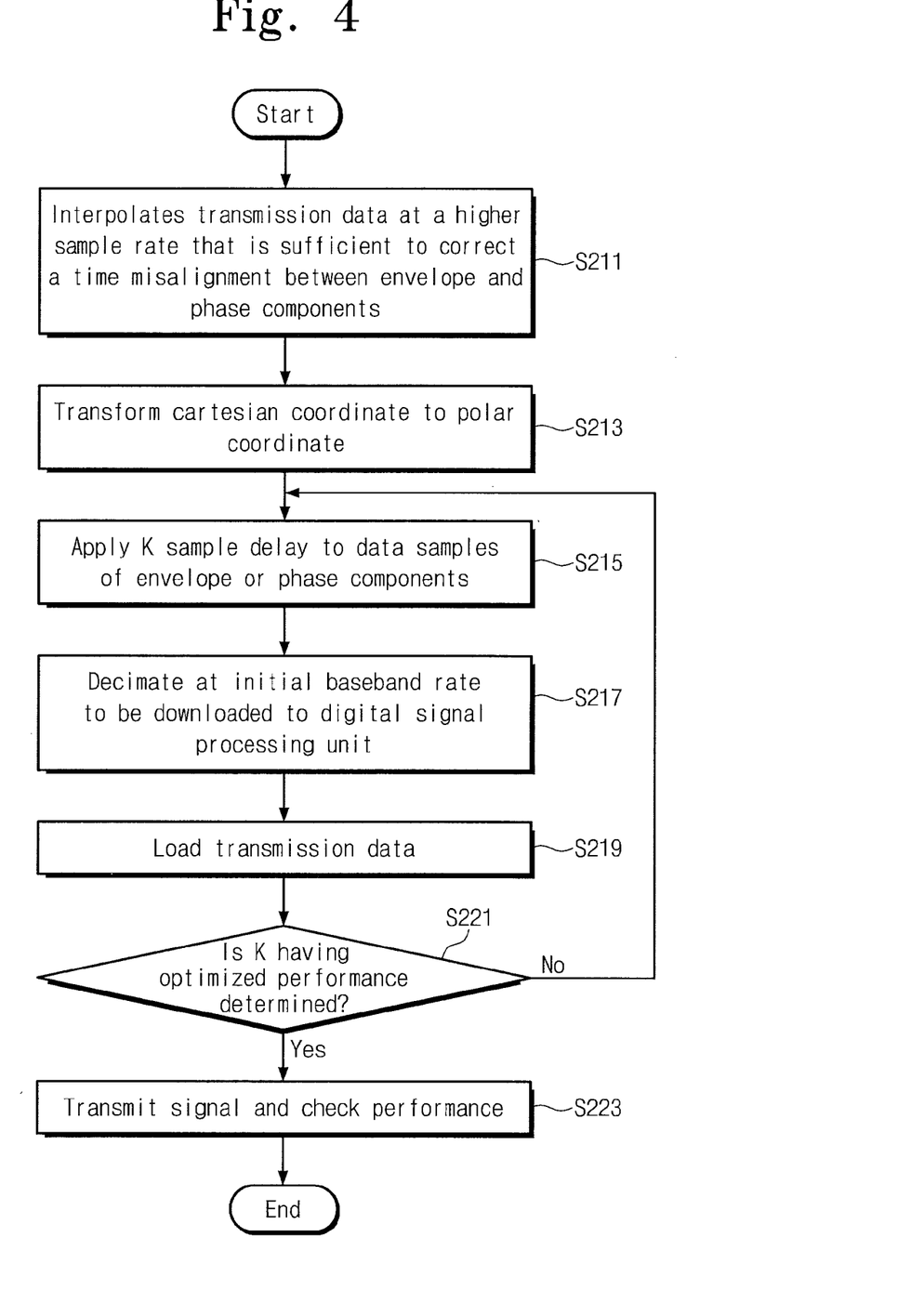
FIG. 4 illustrates an exemplary operation of correcting a time misalignment between envelope and phase components in the structure of FIG. 3.

FIG. 4 illustrates an exemplary operation of correcting a time misalignment between the envelope and phase components in the structure of FIG. 3.

Referring to FIG. 4, the pre-processor 250 interpolates transmission data at a higher sample rate that is sufficient to correct a time misalignment between envelope and phase components (operation S211). For example, the interpolated data rate is the same as an operation speed of the DSM 232.

The pre-processor 250 transforms the transmission data from Cartesian coordinates (I+jQ) into polar coordinates (A∠φ) (operation S213).

The pre-processor 250 applies a time delay on the basis of a sample unit K to at least one of the envelope and phase components (operation 215). Here, K is 0 or a positive integer (1, 2, 3, . . . ). The sample rate related to K is the rate of the interpolated data.

The pre-processor 250 recombines the envelope and phase components that are delayed by the K sample unit, and decimates the recombined result at a rate of initial baseband data that is to be downloaded to the digital signal processing unit 210 (operation S217). At this time, the signal processing apparatus 200 stores the decimated data in an internal memory.

The signal processing apparatus 200 loads the transmission data stored in the memory (operation S219). The signal processing apparatus 200 may transmit a signal by operations of digital signal processing, digital-to-analog conversion and modulation.

Then, it is determined whether a K value shows optimal performance (operation S221). Here, the performance means the EVM and ACLR. Namely, the K value may be determined on the basis of the EVM and ACLR.

When a current K value is not determined to show the optimal performance, the signal processing apparatus 200 proceeds to operation S215.

When the current K value is determined to show the optimal performance, the signal processing apparatus 200 proceeds to operation S223 and check performances except the time misalignment of the signal processing apparatus 200 (operation S223).

The signal processing apparatus 200 separates a signal that is compensated through pre-processing into envelope and phase components and each component is digital-to-analog converted. The signal processing apparatus 200 up-converts the phase component among digital-to-analog converted signals, delta-sigma modulates the envelope component, and mixes the two outputs. The signal processing apparatus 200 outputs the mixed signal to the power amplifier 400.

As described above, an embodiment of the present invention proposes a method of correcting a time misalignment between envelope and phase components in an apparatus that separates envelope and phase components of a signal, processes them respectively, recombines them and transmitting the recombined signal. For this, the embodiment applies a time delay to at least one of the envelope and phase components in digital and analog signal processing operations and corrects the time misalignment in real time, or includes a pre-processor to apply a time delay to the envelope or phase component through pre-processing of a signal and corrects the time misalignment.

A signal processing apparatus can prevent signal quality degradation due to a time misalignment between envelope and phase components by using a method of correcting the time misalignment between envelope and phase components according to an embodiment of the present invention, which is operable in real time in the signal processing apparatus using an EDSM structure.

In an already implemented EDSM structure to which a real-time time misalignment correcting method according to an embodiment of the present invention is not applied or an arbitrary EER structure other than the EDSM structure, performance degradation due to a time misalignment can be minimized by applying a method of correcting a time misalignment between the envelope and phase components according to an embodiment of the present invention, which requires pre-processing of a signal. Through this, performance of an EER structure except existence of the time difference can be checked.

According to the embodiments of the present invention, signal quality degradation due to a time misalignment between envelope and phase components can be prevented in an arbitrary envelope delta-sigma modulator structure by applying a method of correcting the time misalignment between envelope and phase components of a signal in real time.

Also, performances of an envelope elimination and restoration (EER) structure except existence of the time misalignment can be checked by minimizing performance degradation due to the time misalignment, which requires pre-processing of a baseband signal in the arbitrary EER structure as well as an already implemented EDSM structure to which the method of correcting a time misalignment in real time is not applied.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of correcting a time misalignment between envelope and phase components, comprising:
   separating the envelope and phase components of transmission data;
   delaying at least one of the separated envelope and phase components by a first time on the basis of a sample unit N;
   digital-to-analog converting the first time delayed envelope and phase components;
   delaying the digital-to-analog converted envelope component by a second time on the basis of clock unit M when delta-sigma modulating the digital-to-analog converted envelope component;
   determining whether a combination of the first time delaying operation and the second time delaying operation shows an optimal performance; and
   according to the determining, controlling values of N and M according to the first time and second time delaying operations.

2. The method of claim 1, further comprising:
   up-converting the phase component;
   mixing the up-converted phase component and the second time delayed envelope component; and
   amplifying the mixed signal and transmitting the amplified signal.

3. The method of claim 1, wherein N is 0 or a positive integer.

4. The method of claim 3, wherein a sample rate related to N is an input data rate for the digital-to-analog conversion.

5. The method of claim 1, wherein M is 0 or multiples of 0.5.

6. The method of claim 5, wherein a clock speed related to M is an operation speed of the delta-sigma modulation.

7. A method of correcting a time misalignment between envelope and phase components, comprising:
- interpolating transmission data at a rate for correcting the time misalignment;
- separating the interpolated transmitted data into envelope and phase components;
- time-delaying at least one of the separated envelope and phase components on the basis of a sample unit K and recombining the envelope and the phase components;
- decimating the recombined data at a rate of initial baseband data to be downloaded to a transmitting apparatus;
- determining whether the time delay applied to the interpolated data shows optimal performance; and
- controlling a value of K according to a result of the determining.

8. The method of claim 7, further comprising:
- up-converting the phase component of the decimated data;
- delta-sigma modulating the envelope component of the decimated data;
- mixing the up-converted phase component and the delta-sigma modulated envelope component; and
- amplifying the mixed signal and transmitting the amplified signal.

9. The method of claim 7, wherein K is 0 or a positive integer.

10. The method of claim 9, wherein a sample rate related to K is equal to the rate of the interpolated data.

\* \* \* \* \*